No. 613,238. Patented Nov. 1, 1898.
F. W. BROWN.
TIRE.
(Application filed June 18, 1897.)
(No Model.) 2 Sheets—Sheet 1.
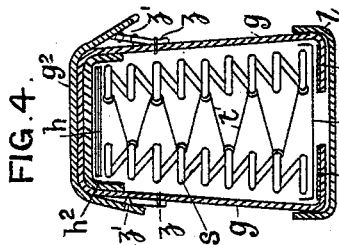
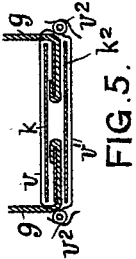
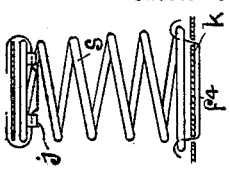
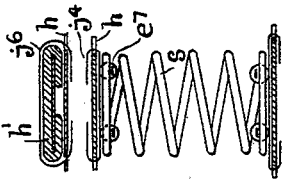
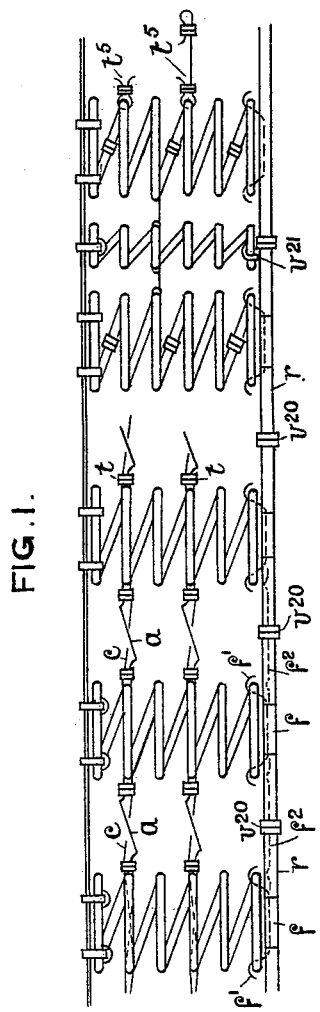
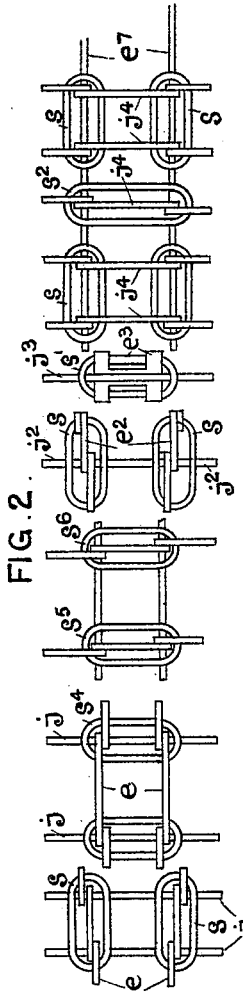
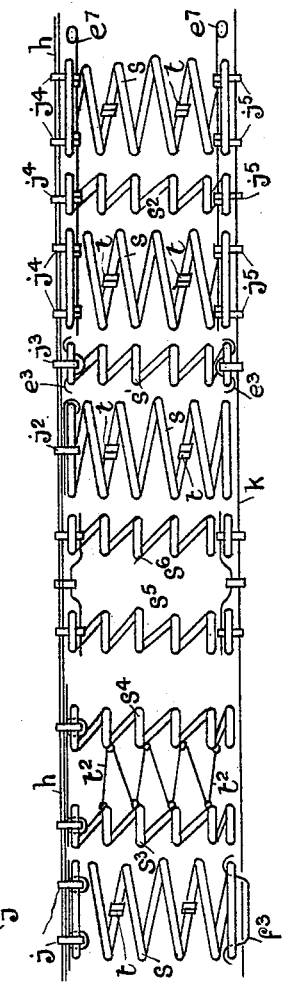
Witnesses
F. S. Elmore
Arthur Ashley
Inventor
F. W. Brown,
By P. T. Dodge Atty.
THE NORRIS PETERS CO., PHOTO-LITHO., WASHINGTON, D. C.

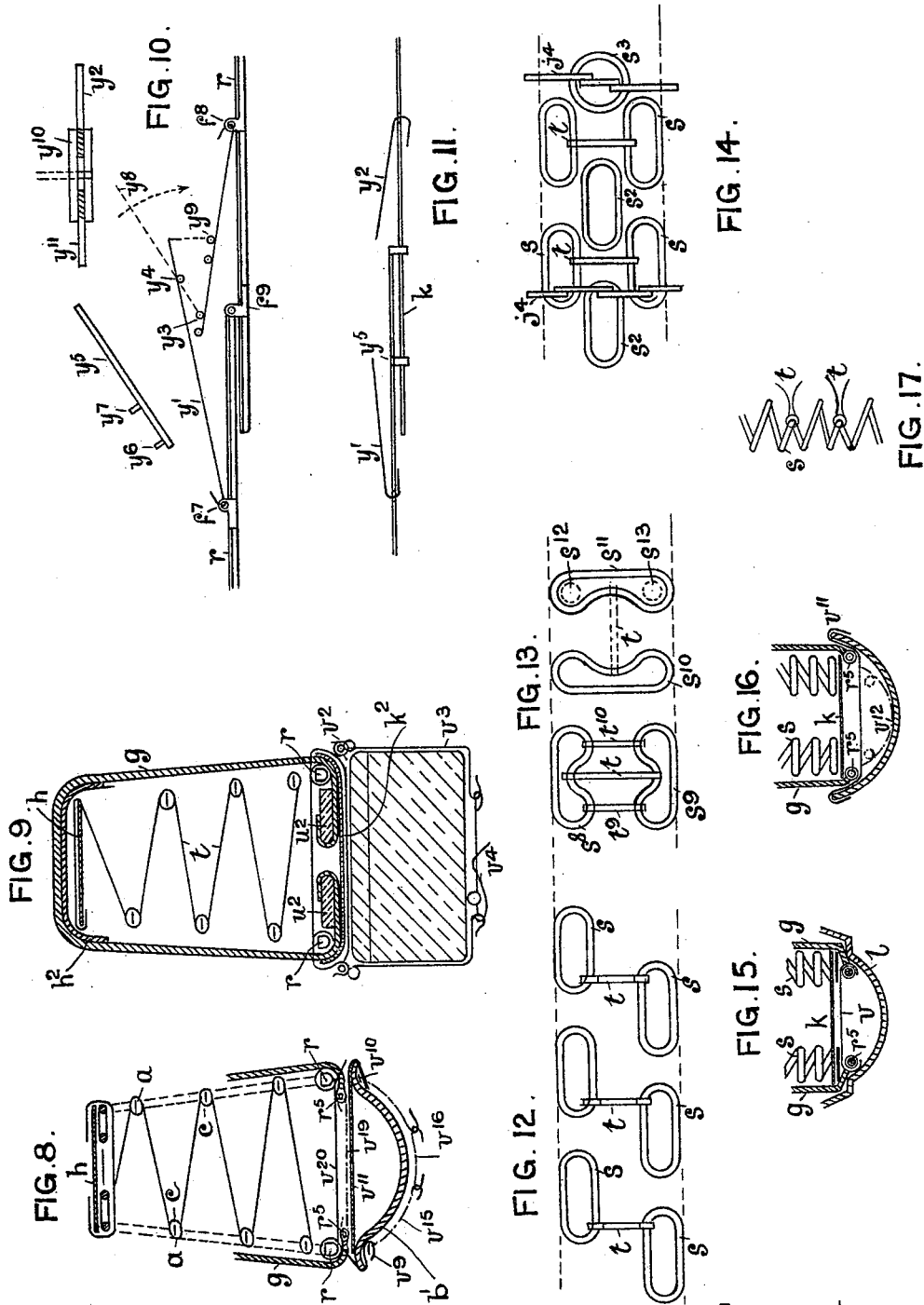

![](United States Patent Office logo)

UNITED STATES PATENT OFFICE.

FREDERICK WILLIAM BROWN, OF YORK, ENGLAND.

TIRE.

SPECIFICATION forming part of Letters Patent No. 613,238, dated November 1, 1898.

Application filed June 18, 1897. Serial No. 641,391. (No model.)

*To all whom it may concern:*

Be it known that I, FREDERICK WILLIAM BROWN, a subject of the Queen of Great Britain, residing at York, in the county of York, England, have invented certain new and useful Improvements in Tires, of which the following is a specification.

This invention relates to spring-tires applicable to the wheels of bicycles, motor-cars, and other vehicles, and has for its object to reduce the vibration caused by the roughness or unevenness of the roads, or, in other words, to effect the same purpose as pneumatic tires.

Referring to the accompanying drawings, Figure 1 is a side elevation of one form of spring-tire with the cover removed; Fig. 2, a plan showing various ways of arranging the springs; Fig. 3, a side elevation of Fig. 2 and a modification of Fig. 1; Fig. 4, a cross-section through one form of spring-tire; Fig. 5, a cross-section showing in part the method of attaching the spring-tire to the felly of an ordinary carriage-wheel; Figs. 6 and 7, cross-sections of a skeleton tire, which are modifications of Fig. 4; Fig. 8, a cross-section showing the method of fixing the tire and cover to an ordinary bicycle-rim; Fig. 9, a similar rim, showing how the tire may be attached to the rim or felly of an ordinary wheel. Figs. 10 and 11 show devices for detachably fastening the tire to a bicycle-rim of special shape; Figs. 12, 13, 14, and 17, views of other forms and arrangements of springs. Figs. 15 and 16 show methods of attaching the spring-tire and cover to various forms of rims.

In order that the construction of my tire may be better understood, I will describe the construction of the different parts of it under the following divisions, viz: first, the base, consisting either of a flat steel band or two rings, either of umbrella-wire or flat steel wire; second, the tread, consisting either of a flexible steel band or a laminated steel band; third, the springs; fourth, the cross-ties and methods of connecting them to the springs by woven wires or otherwise; fifth, the outer cover, either of canvas and rubber or of leather, and, sixth, the methods of attaching the spring-tire and its outer cover to the rim of a bicycle or felly of an ordinary wheel.

First. *The base.*—This may consist of two rings of grooved umbrella-wire, known as the "paragon frame," or of flat steel wire. Onto these rings $r$ small ferrules $f$, Fig. 1, are placed at equal intervals apart, and pieces of thin flat steel tempered wire $f'$ are pushed through these ferrules and have their ends turned down over the lower ends of the springs, as shown. The ferrules are held apart by other flat wires $f^2$, placed in the groove between the ferrules and having their ends bent, as shown. The rings $r\ r$ are held equidistant by short flat steel wires $v^{20}$, Figs. 1 and 8, having eyelets bent at each end and slipped at short intervals onto the rings, and there may be short ends beyond the eyelets to be bent over the ends of the springs if these are placed crosswise in the tire, as shown at $v^{21}$, Fig. 1. The base of the tire may otherwise consist of a flexible steel band $k$, Fig. 3, and in this case the springs may be fastened to it by perforating small holes along its sides and passing the ends of short flat steel wires through these holes and turning them down, as before, over the ends of the springs, as at $f^3$, Fig. 3, and in a similar manner if the springs are placed across the tire, as at $f^4$, Fig. 7. The springs can also be attached to this band by the same methods as will afterward be described for attaching them to the steel band forming the tread.

Second. The tread of the spring-tire may be a thin flexible tempered-steel band $h$, Fig. 3, of a suitable width, or it may be laminated or built up of a number of thinner tempered-steel bands (three or four) of about the same width laid each above the other and held together by short flat wire clips passing around them and clasping their edges. This laminating is to secure greater flexibility at this part and yet prevent the band being permanently bent in passing over any obstruction in the road, the numbers of layers giving sufficient strength to it to enable it to afterward spring back to its original shape.

The springs may be attached to the tread-band as shown in Figs. 2 and 3. One way is to place flat steel wires $e$ on the tops of the springs $s$, these wires having each two eyelets formed in them, through which the flat steel wires $j$ are threaded, and their ends afterward bent around the edges of the band $h$, which has its edges slightly notched at these places to receive them. The springs could be turned the other way, as at $s^3 s^4$, and the wires $e$ and $j$ used for fastening to the band $h$, as before. By another way the eyelet could be threaded onto the top of the spring, as at $e^2$, and only one wire $j^2$ used to secure the springs $s$ $s$ to the flexible band at tread. In all the preceding methods the wires $j$ could be bent, as at $j$ in Fig. 7, to keep the springs apart.

At $s'$, Fig. 2, is shown a spring $s'$, having a piece of sheet metal $e^3$ bent, as at $e^3$, Fig. 3, and placed in the top of this spring to keep the fastening-wire $j^3$ in position therein. The springs can be secured to the tread-band by another method, so as to be readily detachable therefrom in case any of them should break and have to be replaced. For this purpose I use flat wires $j^4$, Figs. 2 and 3, having eyelets formed in them which will protrude downward through the corners of the tops of the springs when these are placed in position. The ends of the wires $j^4$ are bent around the edges of the tread-band $h$, whose edges are notched slightly to receive them and keep them in position thereon. Then the eyelets of the wires $j^4$ being passed through the tops of the springs the flat flexible steel wires $e^7$ in convenient lengths are threaded along through them, thus holding the successive springs firmly to the tread-band $h$, and the springs can be readily detached from the band by withdrawing the wires $e^7$, whose ends have loops, as in Fig. 3, for the purpose of keeping them in position by twisting a bit of fine wire around it and the adjoining spring or by a detachable hook fixed to the tread-band and engaging in the looped end of $e^7$ after the manner of a "safety-pin." The bottoms of the springs can be similarly detachably secured to the base-band $k$, as shown at $j^5$ in Fig. 3. The wires $e^7$ in Figs. 2 and 3 may otherwise be two or more flat steel wires laid above each other and brazed or soldered neatly together at each end, so as to be more flexible and stronger.

The tread-band $h$ is provided with a strip of leather or other suitable material $h'$, Fig. 6, to keep it from chafing the inside of the outer cover of the tire. If the band $h$ is laminated, one or more of the upper bands may be rather narrower than the lowest one and may have the leather $h'$ cemented to it and folded beneath it, as shown, and then secured to the lowest band $h$ by flat wires $j^6$, clenched to its edges, which may be notched to receive them. This method of fixing the band of leather secures a narrow tread. The wires $j^6$ may pass over the upper steel band beneath the leather. Otherwise the leather band could be wider and have its edges folded down, as at $h^2$, Fig. 4, to keep the spring-tire from chafing the outer cover.

Third. The springs of which my tire is constructed are flattened or oval helical steel-wire springs, hardened and tempered and preferably protected from rusting by any suitable method, and are fastened to the base-band $k$ or rings $r$ $r$ and to the tread-band $h$ by the methods hereinbefore set forth. I preferably use springs on one side of the tire coiled a different hand to those on the other side of the tire, and I may arrange all the springs in pairs around the tire, as at $s$, Fig. 2, these pairs of springs succeeding each other at short equal intervals apart; or I may place all the springs singly around the tire, as at $s^3 s^4 s^5 s^6$, Fig. 2, all being turned the other way. In either case the pairs of springs adjoining each other are preferably connected by zigzag cross-ties, as shown at $t$ in Figs. 3 and 4. The springs arranged in couples and connected by cross-ties lying transversely through the tire, as in Fig. 4, give the greatest lateral stability to the tire, which is of importance to enable it to keep it from slipping sidewise when the bicycle is turning a corner. The springs coupled by cross-ties $t^2$, Fig. 3, placed longitudinally in the tire enable it to resist the strain in the driving-wheel of a bicycle or motor-car or other vehicle, especially if all the springs are placed in the tire as at $s^3 s^4 s^5 s^6$, Fig. 2; but the springs placed as at $s$ in Fig. 2 can themselves, owing to their shape, resist a longitudinal strain in the tire and, being coupled by cross-ties placed transversely, have also lateral stability, which latter quality can be increased by tapering tire in cross-section, as in Fig. 4, by gradually decreasing the lengths of the upper cross-ties, thus leaning these springs toward each other at their upper ends and giving a narrower tread-band $h$ and wider base-band $k$. I prefer for all-round purposes to construct my tires having coupled springs $s$, Fig. 2, arranged alternately, with single springs $s^2$ placed the other way, as shown, between each of the succeeding pairs, in which case the springs $s^2$ have each to be as strong as the two springs $s$. Next to this arrangement I prefer to place two springs coupled as at $s^3 s^4$, Figs. 2 and 3, between each successive pairs of springs arranged and coupled as at $s$ $s$. As an alternative I may arrange my springs as at $s$ $s$ in Fig. 12, coupled by zigzag ties $t$, as before; but the springs on one side not being opposite those on the other side give a more even distribution of them lengthwise below every part of the tread.

Fig. 13 shows another and better shape of spring at $s^8$ and $s^9$, their inner sides being indented, so as to allow the zigzag cross-ties $t$ to be longer between the springs, which is very desirable, and short horizontal ties may also be inserted, as at $t^9$ $t^{10}$. At $s^{10}$ $s^{11}$ are shown a pair of springs similarly shaped and placed the other way in the tire. These springs are first coiled of oval shape, and then rods or wires $s^{12}$ $s^{13}$ are temporarily inserted while their sides are being bent inward. All the springs used in the various arrangements hereinbefore set forth and shown on the drawings may be of this indented oval shape, as the wire is thus bent to a more easy curvature at the sides of the springs than in the flattened oval shape, and they are consequently less liable to break at these parts. The springs may be made of wire of round cross-section; but I prefer flattened wire coiled with its edge or thin side uppermost. This enables strong springs to be used without materially increasing their size, and it also compensates for the thickening of the coils of the springs, caused by the eyelets of the zigzag cross-ties when fixed direct onto these parts, and the ties do not, therefore, interfere so much with compression of the springs.

Fourth. The cross-ties by which I prefer to connect my oval helical springs are each formed in a continuous zigzag out of one piece of slightly-tempered flat steel wire, and thus reaching from the tread to the base of the tire. These ties have eyelets formed at each of their angles by giving the wire an extra turn there, which also makes them flexible, so as to easily fold together downward when the springs are compressed. The cross-ties $t$ are placed on the springs by threading the ends of the springs into the eyelets of the cross-ties and then twisting the springs into position, as shown in Fig. 4. Another way of connecting the cross-ties to the springs is by means of flat tempered-steel wires $a$ and $c$, Fig. 1, woven through the loops of the springs on each side of the tire, the wires $c$ being placed more toward the inside of the tire and holding the wires $a$ into the loops of the springs. The cross-ties are threaded by their eyelets onto the wires $a$ $a$ and also hold the inner wires $c$ $c$ within the angles of the ties and the wires $a$ being bent, as shown, so as to jam the ties close up to the springs, which are threaded alternately with the ties onto the woven wires. The woven wires may also some of them be placed tangentially to the base of the tire, if desired. Another method is to connect the ties to the springs by small pieces of flat steel wire bent round the springs, as at $t^5$, Fig. 1, and having their ends passed through the eyelets of the ties and clenched or one part continuing to a similar connection on the next adjoining spring.

Fifth. The outer cover of my spring-tire may be of canvas and rubber, as is used for pneumatic tires; but in the case of heavy vehicles I prefer to use leather, as being more durable and more easily repaired. At $g^2$, Fig. 4, is shown a renewable tread, of leather or other suitable material, fixed to the outer cover $g$, so as to be easily taken off when worn without detaching the cover from the spring-tire. For this purpose I sew small strips of leather $z$ $z$ along each side of the cover, having their upper edges free, and along these upper edges, at short intervals apart, I make a row of small holes, preferably lined with metal eyelets $z'$, (same as those used in laced boots,) and I sew the edges of the tread $g^2$ to these eyelets. I first place the eyelets over the edges of the tread $g^2$ and make the holes in it opposite the eyelets $z'$. Then I sew on one side of the tread, and the remaining side can be sewed to its eyelets by first sewing a short length slack and afterward pulling the threads tight, and so on.

Sixth. I have several methods of attaching my spring-tire and its outer cover to the rim or felly, my principal object in all of them being to make the outer cover readily detachable from the spring-tire for the purpose of repairing either of them and also to make both of them easily detachable from the wheel-rim for similar purposes.

Figs. 4, 5, 8, and 9 show various methods of doing this. In Fig. 4 the edges of the outer cover $g$ are shown having thin bands $u$ of spring-steel cemented to them, so that when the cover $g$ is placed around the spring-tire the base-band $k$ rests upon the bands $u$ $u$, and thus holds the cover to the rim $l$. The rim used is a recessed one, as shown, so that its turned-up edges prevent the withdrawal of the bands $u$ $u$, which need not be each in one continuous piece, so as to give allowance for stretching them over the rim in fixing. The band $k$ is also provided with means of stretching circumferentially and being tightened upon the rim, as will be afterward shown and described, so that when such band is being tightened it slides upon the upper surfaces of the bands $u$ $u$. Of course the rings $r$ $r$ may be substituted, as before described, for the band $k$ and will have similar means of stretching and tightening afterward in fixing them to the rim $l$.

As an alternative, if the rings $r$ $r$ are used for the base of the spring-tire, as in Fig. 9, the edges of the cover may be thickened, so as to lock or catch upon the inner sides of these rings, as shown at $u^2$ $u^2$. For this purpose they may be cemented around short pieces of a suitable stiff material, such as wood, so as to be able to exert a leverage on them in stretching the cover around the spring-tire. If the band $k$, Fig. 4, had its edges turned downward instead of upward, as shown, the edges of the cover could be thickened and stiffened, as at $u^2$, Fig. 9, and could thus obtain a leverage on these turned-down edges of the band $k$. In attaching the spring-tire and its outer cover to the felly of an ordinary carriage-wheel I first of all secure them to a flexible steel band $k^2$, Fig. 5, by flat wire clips $v$ and $v'$, clasping the two bands $k$ and $k^2$ together, the wire $v$ having eyelets or hooks at its ends, which protrude through the cover $g$ and coincide with similar hooks or eyelets at the ends of the wires $v'$, and through these eyelets and the succeeding ones I push stiff steel wires $v^2$, thus detachably securing the whole together. The lower band $k^2$ may have its edges turned up, as in Fig. 9, and if, as in Fig. 9, wire rings $r$ $r$ are substituted for the band $k$ in Fig. 5 they and the cover may be detachably secured to the band $k^2$ by the same method as the preceding one P. The steel band $k^2$ is made of a size just large enough to slide onto the felly of the carriage-wheel. It is provided with flat tempered-steel wires $v^3$, Fig. 9, which are hinged to the edges of the band $k$ or to the wires $v^2$ so as not to interfere with slipping the band onto the wheel. The other ends of these wires $v^3$ are bent so as to clasp the under sides of the felly and provided with eyelets at their ends, in which a wire $v^4$, bent into the shape of a safety-pin, is detachably fastened. The object of this arrangement is to prevent the tire slipping sidewise off the felly and to make it readily detachable therefrom. The band $k^2$ may be slightly concave on its under side, if required, and should be secured at its ends, so as to be inextensible circumferentially.

Now in detachably fastening my tire to a bicycle-rim of the shape shown at $l$ in Fig. 4 I make the bands $u$ non-continuous by overlapping, so as to be extensible, and the baseband $k$, to which the bottoms of the springs $s$ are fastened, has its ends overlapping for about six inches, as shown in Fig. 11 at $k$, and these are held in alinement by sliding within flat steel-wire clips $v^5$, secured at their ends to the upper band and passing around the lower band. Then in order to tighten the band on the rim its circumference is reduced by causing the ends to overlap in the following manner: I fix wires $y'$ and $y^2$ to both the sides of the band by hooking them into holes therein and sufficiently far apart to enable the intermediate parts of these wires $y' y^2$ to pass through the cover of the tire to the outer side. Then, as in Fig. 10, their outer ends are bent into eyelets or hooks, as at $y^3 y^4$, and a lever $y^5$ has two studs $y^6 y^7$, which are placed in the eyelets $y^3 y^4$ and the end of the lever pulled over in the direction of the arrow, (which draws the parts near the ends of the band where $y' y^2$ are fixed together,) after which the end of the lever (which is bent to form a catch) is hooked onto the wire $y^2$; but, if desirable, the lever may be detached from the wires after tightening the band, and the end of the wire $y'$ may be secured by hooking into the eyelet $y^9$ in the other wire.

If rings, either of umbrella-wire or of flat wire, are used for the base of the tire, as at $r$ in Fig. 10, I solder two ferrules $f^7 f^8$ to these rings with upper projections, through which the ends of the wires $y' y^2$ are hooked, and a ferrule $f^9$ is fixed to one end of the ring and slides upon the other end of the ring to keep them in line. Now instead of this method of tightening the base of the spring-tire upon the rim I may tighten the band or rings by fixing a right-handed screw-thread on the end of the wire $y'$ and a left-handed thread on $y^2$ and drawing them together by a right and left handed screwed sleeve or ferrule $y^{10}$ with a hole bored crosswise through it to insert a skewer for screwing it round.

There are a great many ways of tightening and loosening the band or rings in attaching and detaching them from the rim of the wheel which could be adapted to the above, but they consist, as before, in reducing the circumferential length of the band $k$ or rings $r$ in fixing the spring-tire and cover to the rim and in increasing their circumferential length in detaching them from the rim. In rims of large diameter or of deep section the band $k$ or ring $r$ could be two or more lengths circumferentially, all joined as before set forth, and shown in Figs. 10 and 11.

In fixing the tire and cover to a bicycle-rim of the shape generally used for pneumatic tires and shown in Fig. 8 at $b'$, in order to get a firm bearing thereon I place flat metal bands $v^{11}$ across its upper side at short intervals apart and preferably of slightly-tempered steel. The ends of these bands are bent to clasp the flared-out edges of the rim and also to hold a tempered-steel flat wire $v^{10}$ in position below the rim at each side when the wire $v^{10}$ is slipped freely through under successive ends of the bands. Then I fix flat wire hooks $v^9$ to the sides of the base of the spring-tire (which base in this case consists of the two rings $r r$, though a steel band could be substituted for them, as in my other methods of fixing.) The hooks in this case are continuations of the flat wire tires $v^{20}$, which have eyelets coiled in them at equal distances apart and through which eyelets the two rings $r r$ have been previously placed so as to be thereby held equidistant along their entire circumferences. The hooks $v^9$ are thus flexibly hinged to the rings $r r$ and are passed through holes made in the outer cover and then clasp the edges of the rim, as at $v^9$, being held in position thereon by the flat wires $v^{10}$, slipped through their ends, the hooks $v^9$ clasping the edges of the rim at near the same places as the ends of the bands $v^{11}$ do. The outer cover here shown is one adapted for a detachable pneumatic tire having wired edges $r^5$, which are held in position around the spring-tire either by passing inside the shanks of the hooks $v^9$, as shown, or by being secured together by short wires $v^{19}$, hooked at their ends to $r^5$. Thus the hooks $v^9$ are readily detachable from the rim by slipping out the wires $v^{10}$. If desirable, the hooks $v^9$ could be continued round the under side of the rim, as shown at $v^{15} v^{15}$, and could be coupled together by short wires $v^{16}$, bent through their ends, as shown.

In all the methods of fixing such as shown in Fig. 8 the base of the tire (band or rings) would be made to exactly fit and clasp the rim circumferentially or to be tightened onto it by methods shown in Figs. 10 and 11, the hooks preventing it from slipping off sidewise; but, if desirable, the hooks alone could be depended upon to hold the tire onto the rim irrespective of any circumferential tension of the band or rings at base of the tire. Also, the outer cover could be provided at its edges either with flat steel bands, as in Fig. 4 at $u u$, or with locking edges thickened and stiffened, as at $u^2$ in Fig. 9.

As regards the arrangement of springs shown in Fig. 2 at $s$ $s^2$ and $s$—viz., having the coupled pairs of oval springs $s$ alternating with single oval springs $s^2$ placed the other way—by referring to Fig. 14 it will be seen that the single oval springs $s^2$ may be placed the same way as the coupled springs $s$, and, if desirable, ordinary helical springs may be substituted for the oval springs $s^2$ in these combinations, as shown at $s^3$. The parts $j^4$ correspond to those shown at $j^4$ in Fig. 2 for the purpose of detachably fixing the springs to the bands at the tread and base of the tire.

Fig. 15 is a section showing a method of detachably fixing the spring-tire and cover to a Dunlop detachable rim $l$, having a wired-on cover $g$. The base-band $k$ has the wired edges $r^5$ of the cover secured underneath it at short intervals by the flat steel wires $v$, hooked at their ends to $r^5$, which edges may have the wire in them in short lengths, so as to be stretchable. The edges of $k$ rest upon the shoulder of the rim, as shown, and the tire is held thereto by reducing the diameter of band $k$, and thus tightening it, as before shown. Thin steel bands or strips may be laid under the edges of $k$ to lessen friction on the cover when tightening $k$ on the rim.

Fig. 16 shows a method of fixing to a crescent-shaped rim. In this case I place flat metal clips $v^{11}$ at short intervals across the rim, having the ends bent round its edges and the intermediate parts sunk to form a recessed bearing for the band $k$, and the tire and cover are fastened by the band $k$ to the rim the same as before. The bands $v^{11}$ may be further depressed, as in dotted lines $v^{12}$, which make this rim with shoulders identical with those in Fig. 15. Strips of cane could be substituted for the wires $r^5$ in pockets of the cover $g$.

The springs in Fig. 3 can be connected longitudinally by horizontal ties with eyelets at each end, as shown at $o$, placed half-way between tread and base.

In coupling indented oval springs together by means of zigzag cross-ties only those parts of the springs need be indented to which the eyelets of the ties are connected, (see Fig. 15,) the other or alternate parts of the springs lying between these indented parts being of oval shape, and the parts of the ties adjoining their eyelets can be bent in toward each other. By this method of construction the eyelets on the indented parts of the springs are out of the way of the oval parts of the springs lying between these indented parts, and the springs can therefore be compressed to their utmost extent, as they are not impeded by the parts of the cross-ties adjoining them.

I declare that what I claim is—

1. A tire for cycles, motor-cars and other vehicles comprising a double row of springs, each spring being in the form of a flattened helix, that is, oval in shape, and said springs being connected together from side to side by zigzag ties of thin steel constructed and arranged substantially as shown.

2. In a spring-tire constructed of helical springs fixed to a suitable base-band, the combination therewith of a tread consisting of a laminated flexible steel band covered on its outer side with a detachable india-rubber cover secured to the laminated tread in a suitable manner substantially as shown.

3. The combination with a base-band of tread $h$, springs $s$, cross-ties $t$, and cover $g$, and a renewable tread $g^2$ placed outside the cover and removably attached thereto.

4. The combination of a metal base-band $k$, a double row of helical springs $s$ mutually supporting each other by cross-ties $t$ and tapering inward in the direction of the tread, a tread consisting of one or more flexible-metal bands, a flexible cover, and means for attaching the springs to the base $k$ and tread $h$.

5. The combination with the springs $s$ a base-band $k$ and a tread-band $h$, of wires $e^7$ and $j^4$ the latter having eyelets and being attached to the base-plate and tread-plate as shown, and the springs $s$ being attached to such plates by the wires $e^7$ passing through the eyelets in the wires $j$.

6. In a spring-tire the combination with a double row of springs $s$ mutually supported by cross-ties $t$ and provided with a flexible tread-plate, of a flexible strip $h'$ covering one or more additional tread-plates and turned between such plate or plates and the plate $h$ and wires $j^6$ binding them together.

7. In a spring-tire a band $k$ springs $s$, cross-ties $t$ tread $h$ detachable cover $g$ having wired edges $r^5$ in combination with hooked wires $v$ engaging the wired edges.

8. The combination of a double row of springs $s$, cross-ties $t$, flexible tread $h$, cover $g$ fixed to a suitable base-plate, and wires $v^3$ and $v^4$ for securing the tire to an ordinary carriage-wheel.

9. The combination of a double row of flattened springs $s$ mutually supported by zigzag ties $t$, and a contractible base-band $k$ or $r$ for holding same to a rim.

10. In a spring-tire having a double row of flattened springs $s$, zigzag ties $t$, flexible tread $h$ and cover $g$ the combination therewith of a base which is contractible within the cover.

11. The combination of a double row of springs $s$, ties $t$ flexible tread $h$, contractible base $k$, and a detachable cover $g$ having bands $u$ in its edges upon which the band $k$ is tightened in holding it onto the rim.

12. The combination of a double row of springs $s$ cross-ties $t$, flexible tread $h$, a suitable base $k$ and a detachable cover $g$ held to the base $k$ by bands $u$ in its edges.

13. The combination of a double row of springs $s$, cross-ties $t$, flexible tread $h$, a base, rods $r$ and a cover $g$, forming the outer tread and suitably secured at its edges below the base of the tire.

14. In a spring-tire having a double row of flattened springs $s$, cross-ties $t$, flexible tread $h$ which is narrower than the base of the tire and to which the springs converge, the combination therewith of a cover $g$ in which a narrow tread is thus produced.

15. In a spring-tire the combination of a double row of flattened springs $s$ supported by ties $t$ and a flexible tread $h$ which is narrower than the base of the tire so that the outer sides of the springs converge toward the tread and a tapered section of tire is thus produced.

16. The combination with a flexible tread, of a double row of flattened springs $s$ supported by zigzag ties $t$ which gradually shorten as they approach the tread thus leaning the springs toward each other, whereby a tapered section of the tire is thus produced.

17. The combination with a double row of flattened springs $s$ and cross-ties $t$ of a flexible laminated steel tread $h$, covered upon its upper side with a flexible strip $h'$ and means for holding the several layers composing the steel tread together.

18. The combination with a double row of flattened springs $s$ supported by cross-ties $t$ and converging inward at the tread, of a narrow flexible steel tread $h$ preferably laminated as herein set forth.

19. The combination with a double row of flattened springs $s$ supported by ties $t$, of a flexible steel tread-band $h$.

20. In combination, a base $k$, springs $s$ arranged in a double row, cross-ties $t$, flexible tread $h$, cover $g$ and a recessed rim.

21. In a tire having springs located between a base-plate and a flexible tread-plate and attached thereto, a means of keeping the fastenings in their relative positions along such plates by notches in the edges of the plate with which the fastenings engage.

22. In a spring-tire having a double row of springs $s$ supported by zigzag ties $t$, the manner of connecting ties to springs by threading the springs through eyelets formed in the angles of the ties.

23. In a tire cross-ties $t$ made continuous from base to tread of the tire and having eyelets formed in their angles.

24. A means of connecting zigzag ties $t$ to springs $s$ by flat wires passing through or around the springs, and held in the angles of the ties.

25. A spring-tire having a double row of springs $s$ mutually supporting each other by cross-ties $t$, the springs in one row coiled oppositely to those in the other row.

26. A spring-tire having a double row of springs $s$ supported by zigzag ties $t$, the springs having each alternate coil indented.

27. A spring-tire having a double row of flattened springs $s$ supported by zigzag ties $t$, the said springs being formed of wire of flattened section as set forth, thus giving more space between the coils of the springs.

In testimony whereof I have signed my name to this specification in the presence of two subscribing witnesses.

FREDERICK WILLIAM BROWN.

Witnesses:
HENRY HOPKINSON WOOD,
EDWD. HY. JACKSON.